(12) United States Patent
Rogers et al.

(10) Patent No.: US 6,346,964 B1
(45) Date of Patent: Feb. 12, 2002

(54) INTEROFFICE BROADBAND COMMUNICATION SYSTEM USING TWISTED PAIR TELEPHONE WIRES

(75) Inventors: Steven Rogers, Tuftonboro, NH (US); Brian Hoppes, Herndon; Ed Koenig, Manassas, both of VA (US)

(73) Assignee: Video NetworkCommunications, Inc., Portsmouth, NH (US)

( * ) Notice: Subject to any disclaimer, the term of this patent is extended or adjusted under 35 U.S.C. 154(b) by 0 days.

(21) Appl. No.: 08/777,881

(22) Filed: Dec. 31, 1996

(51) Int. Cl.[7] ................................................. H04N 7/14
(52) U.S. Cl. ................. 348/14.11; 370/430; 348/14.03; 348/14.05; 348/14.07
(58) Field of Search ............................ 348/14–17, 6–8; 379/90.01, 93.01, 93.14, 93.17, 93.21, 202, 100.12; 370/260, 265, 430, 401; 709/204

(56) References Cited

U.S. PATENT DOCUMENTS

| | | | |
|---|---|---|---|
| 3,662,110 A | * 5/1972 | Van Fossen et al. | 348/14.11 |
| 3,873,771 A | 3/1975 | Kleinerman et al. | |
| 3,922,491 A | * 11/1975 | Bjork et al. | 348/14.11 |
| 3,974,337 A | 8/1976 | Tatsuzawa | |
| 3,997,736 A | 12/1976 | Gorman, II | |
| 4,054,910 A | 10/1977 | Chou et al. | |
| 4,533,943 A | 8/1985 | Poirier | 348/14 |
| 4,564,940 A | * 1/1986 | Yahata | 370/430 |
| 4,589,011 A | 5/1986 | Rzeszewski | |
| 4,654,866 A | * 3/1987 | Bottle | 348/16 |

(List continued on next page.)

FOREIGN PATENT DOCUMENTS

| | | |
|---|---|---|
| EP | 0 239 908 A2 | 3/1986 |
| EP | 0571119 A1 | 11/1993 |
| EP | 0696124 A2 | 2/1996 |
| WO | WO 93/11637 | 6/1993 |
| WO | WO 95/01055 | 1/1995 |
| WO | WO 96/23388 | 1/1996 |
| WO | WO 96/17474 | 6/1996 |

OTHER PUBLICATIONS

International Search Report dated Jun. 24, 1998 from PCT/US97/23790.

Schlichthaerle, D.: "Hybrid ATM/ISDN Subscriber Connection to a Broadband ISPBX", Intern. Conference on Computer Communication. Proceedings of the Conference. Towards a New World in Computer Communication, Sep. 28, 1992, pp. 209–213.

Horn, D.N. et al.: "An ISDN Multimedia Conference Bridge", IEEE Tencon '90: 1990 IEEE Region 10 Conference on Computer and Communication Sytems, 09–24/27–90, pp. 853–856, vol. 2.

Primary Examiner—Curtis Kuntz
Assistant Examiner—George Eng
(74) Attorney, Agent, or Firm—Banner & Witcoff, Ltd.

(57) ABSTRACT

A system including a broadband switch includes a controller which coordinates video call set-up and a switch for connecting various phone lines together through diplexers. The system permits video telephone conferencing and other video related applications to be performed over ordinary telephone wires. Two diplexer/modems are typically provided for each user: one at the user's telephone jack and another at the central PBX location for that user's telephone line. The PBX connections can usually be made in a central wiring closet. A video server can also be provided which retrieves video images from disk to provide on demand to users. the existing PBX handles the switching of normal telephone audio signals, and a broadband data switch handles the switching of broadband signals over the same telephone wires that the PBX uses. The broadband switch essentially "piggybacks" off the PBX system and avoids interference with telephone signals through the use of diplexers.

40 Claims, 15 Drawing Sheets

U.S. PATENT DOCUMENTS

| | | | |
|---|---|---|---|
| 4,710,917 A | 12/1987 | Tompkins et al. | |
| 4,796,254 A | 1/1989 | van Baardwijk et al. | |
| 4,847,829 A | 7/1989 | Tompkins et al. | |
| 4,849,811 A | 7/1989 | Kleinerman | |
| 4,955,048 A | 9/1990 | Iwamura et al. | |
| 5,010,399 A | 4/1991 | Goodman et al. | |
| 5,014,267 A * | 5/1991 | Tompkin et al. | 370/259 |
| 5,130,792 A * | 7/1992 | Tindell et al. | 379/93.25 |
| 5,130,793 A | 7/1992 | Bordy et al. | |
| 5,164,980 A | 11/1992 | Bush et al. | |
| 5,164,982 A | 11/1992 | Davis | |
| 5,199,061 A | 3/1993 | Kim | |
| 5,200,989 A * | 4/1993 | Milone | 348/14.11 |
| 5,247,347 A * | 9/1993 | Litteral et al. | 348/14 |
| 5,282,241 A * | 1/1994 | Aoki et al. | 379/93.14 |
| 5,283,637 A | 2/1994 | Goolcharan | |
| 5,329,572 A * | 7/1994 | Martens | 348/16 |
| 5,374,952 A | 12/1994 | Flohr | |
| 5,440,554 A | 8/1995 | Stanndard et al. | |
| 5,450,123 A | 9/1995 | Smith | |
| 5,461,616 A * | 10/1995 | Suzuki | 348/14 |
| 5,534,912 A | 7/1996 | Kostreski | |
| 5,537,142 A | 7/1996 | Fenouil | |
| 5,541,640 A | 7/1996 | Larson | |
| 5,565,910 A * | 10/1996 | Rowse et al. | 348/14.1 |
| 5,572,347 A | 11/1996 | Burton et al. | |
| 5,594,725 A | 1/1997 | Tischler et al. | |
| 5,610,910 A * | 3/1997 | Focsaneanu et al. | 370/401 |
| 5,617,539 A * | 4/1997 | Ludwig et al. | 709/205 |
| 5,621,455 A | 4/1997 | Rogers et al. | |
| 5,625,677 A * | 4/1997 | Feiertag et al. | 379/93.01 |
| 5,668,857 A * | 9/1997 | McHale | 379/93.14 |
| 5,835,126 A * | 11/1998 | Lewis | 379/100.12 |
| 5,878,047 A * | 3/1999 | Ganek et al. | 370/486 |

* cited by examiner

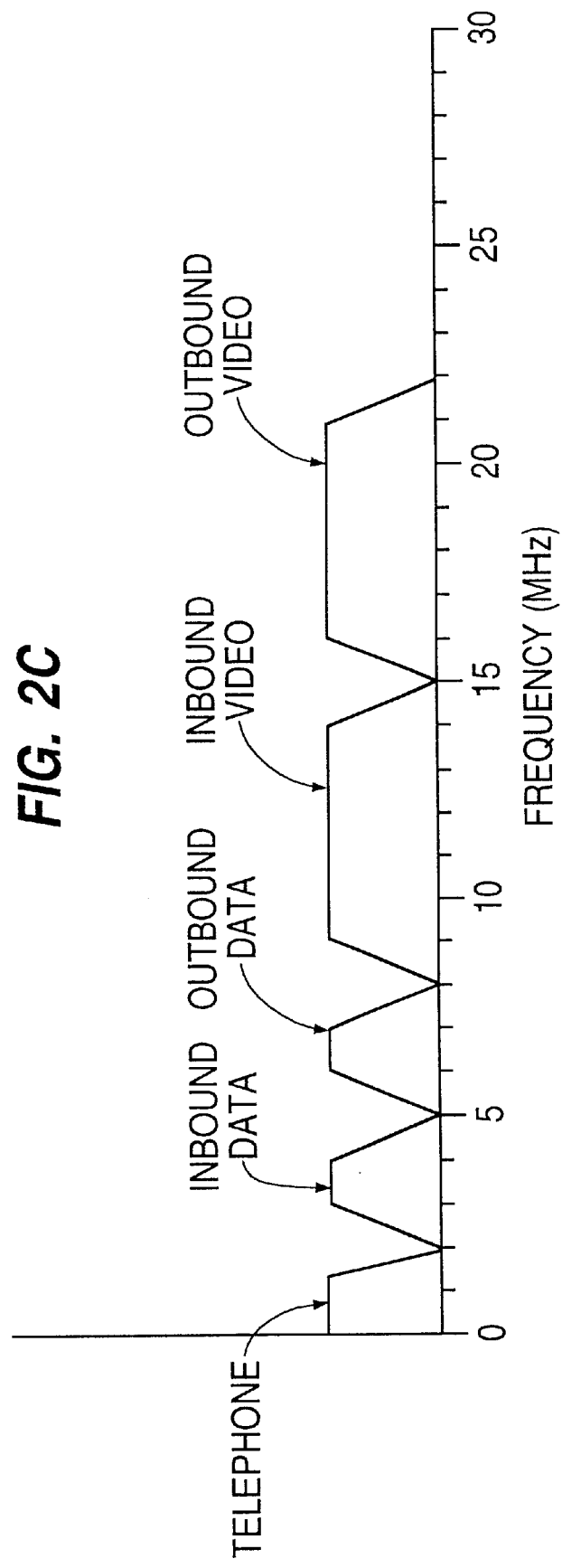

INTEROFFICE BROADBAND COMMUNICATION SYSTEM USING TWISTED PAIR TELEPHONE WIRES

This invention is related in subject matter to allowed U.S. application Ser. No. 08/352,112 (now U.S. Pat. No. 5,621,455) entitled "Video Modem For Transmitting Video Data Over Ordinary Telephone Wires", filed on Dec. 1, 1994. The aforementioned application is hereby incorporated by reference in its entirety.

BACKGROUND OF THE INVENTION

1. Technical Field

This invention relates generally to a broadband communication system which makes use of ordinary twisted pair telephone wires already installed in a facility such as an office building. The invention provides for bidirectional transmission of full-motion color video, stereo audio, and data signals over ordinary telephone wires without interfering with existing telephone equipment. One application of the invention is video teleconferencing between two or more telephone users in an office connected through a telephone switch such as a Private Branch Exchange (PBX).

2. Related Information

Conventional video teleconferencing systems often include line services for parties to a teleconference, bridging services which coordinate calls among parties at multiple locations, and public room services which provide video conferencing equipment to the public on a usage charge basis. Presently available systems include permanently installed systems, portable boardroom systems, and desktop systems. However, such systems are expensive and often require the installation of high bandwidth wiring and related equipment. Less expensive systems typically provide inferior video quality which is unacceptable for videoconferencing purposes.

Various techniques for transmitting video information over ordinary telephone wires are well known. For example, U.S. Pat. No. 5,164,982 to Davis discloses a system which transmits text, graphics, and picture data over existing telephone lines. U.S. Pat. No. 5,199,061 to Kim discloses a system which transmits freeze frame video between users over standard telephone lines. U.S. Pat. No. 5,283,637 to Goolcharan contemplates a system which allows for transmission of full motion color video, voice and data over ordinary telephone wires. U.S. Pat. No. 5,541,640 to Larson discloses a so-called "videophone" which allows simultaneous transmission of audio and video over a standard telephone line.

Unfortunately, providing two-way videoconferencing capabilities in an interoffice environment over ordinary telephone wires is presently quite expensive. In the current market, video application systems with high-resolution, realistic images can cost more than $15,000 for a unit that operates at only one location within a facility. Desktop system alternatives, while generally cheaper, provide degraded images and limited audio quality. Moreover, complicated infrastructure changes are often necessary to support more than a few units. Existing systems also use proprietary techniques which cannot support standard communication techniques such as ISDN and ATM.

In addition to their high cost, other problems with presently available videoconferencing systems include an inability to provide stereo audio, low quality audio transmission, lack of color (for some systems), and inability to support video retrieval applications. Due partly to these and other shortcomings, videoconferencing systems have not seen widespread use.

SUMMARY OF THE INVENTION

The present invention overcomes the aforementioned problems by providing an inexpensive method and apparatus for switching high quality video, data and audio signals throughout a conventional office telephone system over existing telephone wires. Applications of the present invention include video teleconferencing, broadcasting of program materials within an office, remote video retrieval, remote monitoring, and collaboration on documents and spreadsheets from different locations among others. Because the invention makes use of existing telephone wiring and switching facilities, substantial cost savings can be achieved while providing high quality video transmission.

The invention enables an existing PBX or Centrex business telephone system to be easily upgraded to provide broadband communications capabilities. The invention takes advantage of the fact that much of the bandwidth available within an office building telephone wiring system is unused. Conventional telephone systems typically only use about 5 KHz of bandwidth for an analog telephone and less than 1 MHZ for a digital telephone. Normal twisted pair wiring within an office building, however, can support up to 20 MHZ or so for category 3 cable and 150 MHZ or so for category 5 cable.

Various embodiments of the present invention provide for the transmission and reception of full-motion high quality video, CD-quality stereo audio, and high speed data to and from telephone users in an office building. The invention provides such services over the same basic wiring that serves existing telephone systems and therefore avoids costs associated with new wiring or infrastructure. The invention is compatible with most digital and analog telephony systems sold by leading PBX and telephone vendors, and provides interfaces for newer Integrated Services Digital Network (ISDN) phone systems and Asynchronous Transfer Mode (ATM) networks. Users of the invention can operate video-type applications such as teleconferencing while simultaneously engaging in a telephone conversation over the same telephone wires.

Various embodiments of the system generally include five components: (1) a plurality of video modems which modulate and demodulate video signals in an efficient format over interoffice telephone wires; (2) a broadband data switch which handles set-up and tear-down of video data paths over the telephone wires; (3) a plurality of video teleconferencing stations such as personal computers; (4) a video server; and (5) software which operates across the various components.

A broadband data switch in accordance with the invention can accommodate a variety of interfaces including video modem cards, ATM switches, ISDN lines, and multipoint conference bridges. In various embodiments, the broadband data switch does not rely on a local area network but instead uses ordinary telephone lines for communication. However, the invention is not limited in this respect and thus the invention can be practiced over a conventional LAN such as Ethernet.

An internal video conference call between two or more stations within 2,500 feet of each other (a distance that would permit calls within the largest high-rise buildings) can be connected using the building's existing telephone lines via the broadband data switch. The telephone can be used for incoming and outgoing calls, even while the line is being used for video conferencing or other video applications.

The invention permits any combination of high-quality audio, video, and data to be transmitted over ordinary telephone lines which are shared with an existing telephone switch.

Other features and advantages of the invention will become apparent with reference to the following detailed description and the figures.

BRIEF DESCRIPTION OF THE DRAWINGS

FIG. 2C shows an alternate frequency plan for transmitting video and non-video data (including digitized audio data) using an alternate embodiment of each modem/diplexer 241 shown in FIG. 2B.

DETAILED DESCRIPTION OF THE PREFERRED EMBODIMENTS

Figure 1A:
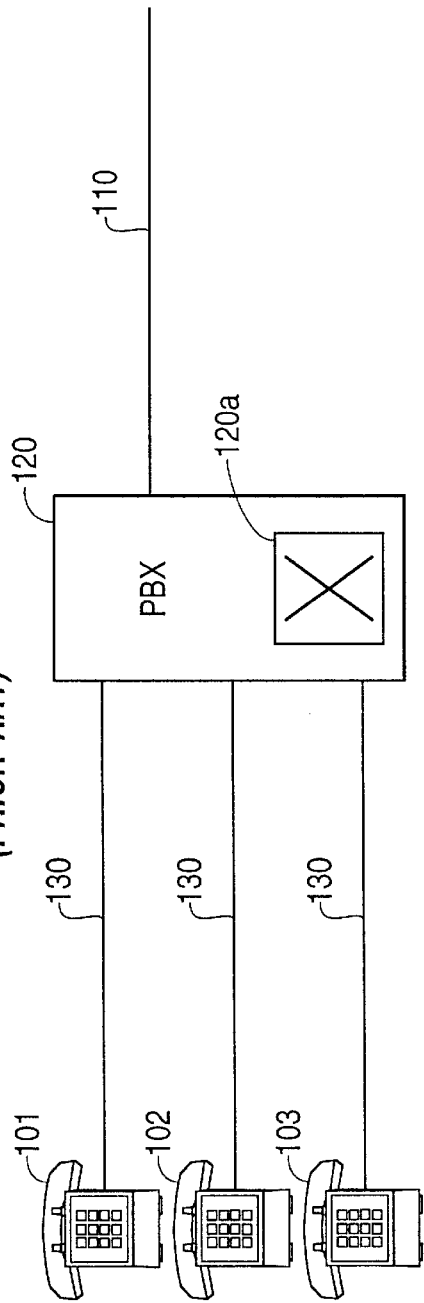
FIG. 1A shows in simplified form a conventional inter-office telephone system including a Private Branch Exchange (PBX) 120 which switches telephone calls between users over unshielded twisted pair telephone wiring 130.

FIG. 1A shows in simplified form a conventional inter-office telephone system including a plurality of telephones 101 through 103 coupled to a telephone switch 120 such as a Private Branch Exchange (PBX) over unshielded twisted pair wiring 130. The PBX includes a switching element 120a which connects individual telephone lines to each other when a call is made within the office.

Each telephone is wired directly to the PBX so that any two telephones can be connected to each other within the PBX. Additionally, the PBX may connect individual lines to one or more outside lines 110 for calls originating or terminating outside the office. The PBX or Centrex type telephone switch 120 is often located in a wiring closet for easy access.

Figure 1B:
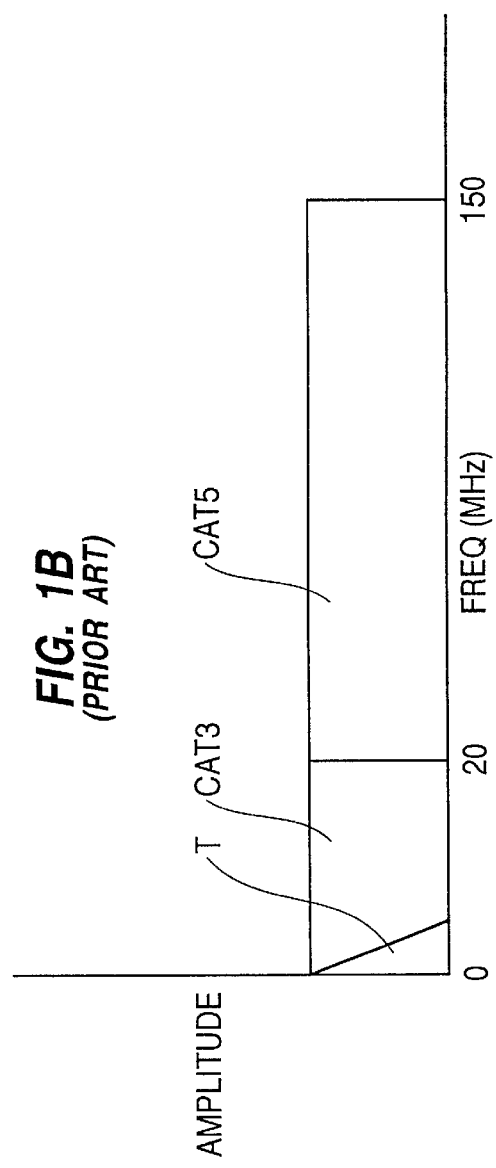
FIG. 1B shows typical frequency usage over conventional twisted pair wiring throughout an office system such as that in FIG. 1A.

FIG. 1B shows a frequency plot illustrating frequency usage on telephone lines within a typical office system. Telephone voice and signaling information T typically comprises signals using frequencies between 0 and 5 KHz for analog systems and between 0 and 1 MHZ for digital phone systems. However, the potentially available spectrum on these individual telephone lines can be up to about 20 MHZ for category 3 telephone cable (CAT3) and up to 150 MHZ for category 5 telephone cable (CAT5). Above these limits, capacitance and other transmission line effects limits signal quality to the point that high quality signals cannot be easily transmitted.

It is evident that much of the frequency bandwidth between the conventional telephone signals T and the aforementioned theoretical limits CAT3 or CAT5 are not used in conventional telephone systems. Nevertheless, conventional telephone switches such as PBX 120 of FIG. 1A generally limit bandwidth to about 5 KHz for telephone calls placed through the switch. Therefore, the extra available bandwidth is typically limited to those lines 130 on the left side of FIG. 1A.

Allowed U.S. patent application Ser. No. 08/352,112 (now U.S. Pat. No. 5,621,455), incorporated by reference herein, discloses a video modem which allows video and other data signals to be transmitted over ordinary telephone wiring. In accordance with that invention, bi-directional video signals can be transmitted over telephone wiring within an office building without interfering with ordinary telephone conversations. Various embodiments of the present invention include a plurality of video modems as described in the aforementioned patent application and a broadband data switch for connecting signals through the video modems.

Figure 2A:
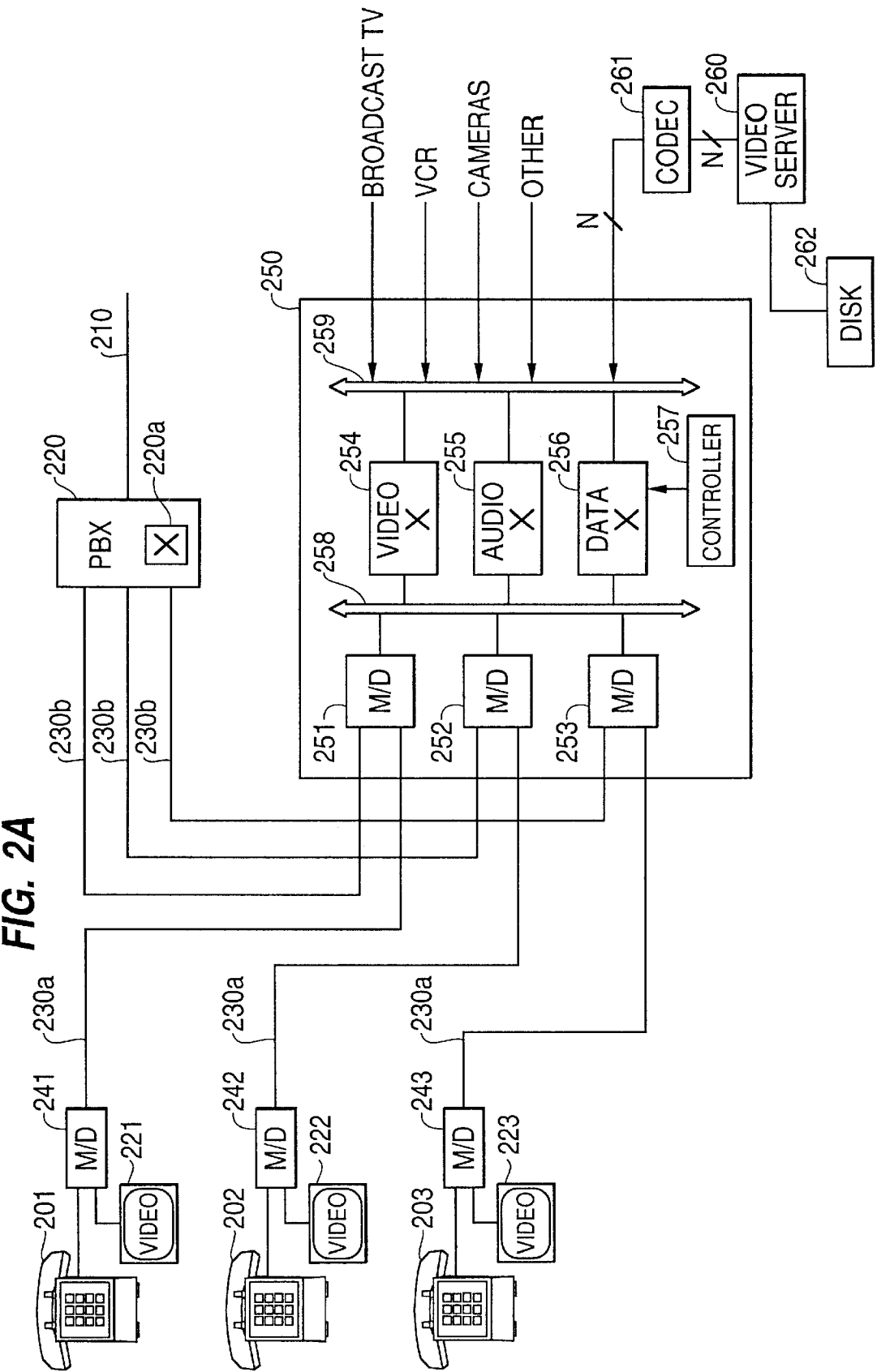
FIG. 2A shows in simplified form a system in accordance with the present invention including a broadband data switch 250 connected in parallel with an existing telephone switch 220.

FIG. 2A shows in simplified form a system employing various principles of the present invention, wherein similar reference numerals have been used to identify the same elements among the figures. In contrast to the configuration shown in FIG. 1A, wherein each telephone is directly wired to telephone switch 120, each telephone in the system of FIG. 2A is connected to a modem/diplexer (elements 241 through 243) and to a broadband data switch 250 which is in turn connected to the existing telephone switch 220. Thus, telephone lines 230a are not directly connected to each other through telephone switch 220 but instead travel through broadband data switch 250 before being connected to telephone switch 220. In essence, broadband data switch 250 "piggybacks" off the existing telephone network to provide new broadband services over the existing telephone lines.

Users can place video "calls" to other users by sending information to the broadband data switch which then attempts to connect to the desired recipient's equipment. If the called user answers, then the inventive broadband switch establishes video, stereo audio and/or high speed asynchronous data channels between terminals for the two users. When one of the users wishes to hang up, a message is sent to the switch which disconnects the two terminals and returns them to an idle state. This connection and disconnection process is entirely independent from the normal telephone system and the existing telephone switch.

Telephone numbers associated with each party can be stored in a memory associated with controller 257 for reference, and each party can place a call either by entering an extension number of the party to be called (or an external number, if applicable) or by selecting from a list of available users. A displayable address book can be provided to store names, addresses and other information such as a digitized bitmap image of each user.

In the embodiment shown in FIG. 2A, broadband data switch 250 includes a plurality of modem/diplexers 251 through 253 each coupled to one of the modem/diplexers 241 through 243 associated with telephones 201 through 203. Each modem/diplexer can comprise a video modem of the type described in allowed U.S. patent application Ser. No. 08/352,112. Such devices provide for modulation and demodulation of video, high quality audio, and message data over ordinary telephone wires without disrupting existing telephone communications. For bidirectional signals, a frequency allocation scheme such as that shown in FIG. 2 of the aforementioned allowed patent application can be used (e.g., video in one direction centered around 9 MHZ and video in the other direction centered around 17 MHZ using frequency modulation), although the particular frequency selection is not of paramount importance. Alternate embodiments are also disclosed herein. Moreover, filtering of sidebands (as suggested in allowed U.S. patent application Ser. No. 08/352,112) (now U.S. Pat. No. 5,621,455) need not be performed if the available telephone line bandwidth justifies it.

High quality stereo audio corresponding to the video signals can be transmitted concurrently with the video signals, and data signals for setting up video conference calls and the like can be transmitted in a data channel within the overall telephone wiring bandwidth limitations. The data channel can be used both for transmitting requests to broadband data switch 250 (i.e., for call set-up) and for transmitting data to other parties to a teleconference (i.e., for collaboration on a document). Any of various modulation schemes such as FSK, QPSK, or QAM can be used for data transmission.

While the above described modem/diplexer has been described particularly as using a narrowband frequency modulation technique, other modulation schemes such as wideband FM or even digital transmission (with or without compression) can be used. Moreover, data can be transmitted using FM, FSK, PSK, ASK and other modulation techniques. Audio information can be transmitted as FM, AM, digital (with or without compression) and the like. Accordingly, the invention is not intended to be limited to any particular modulation technique.

Broadband data switch 250 can be located in the same wiring closet as telephone switch 220, thus enabling the connections shown in FIG. 2A to be made with only minor wiring changes by disconnecting each incoming telephone line 230a from existing telephone switch 220 and connecting it to broadband data switch 250. Thereafter, broadband data switch 250 can be connected to existing telephone switch 220 through new telephone wires 230b. Other wiring configurations are of course possible, the idea being that broadband data switch 250 is interposed between individual telephones and the existing telephone switch.

It may also be possible to couple broadband data switch 250 into the existing telephone wiring network without actually disconnecting existing telephone wires. In such an embodiment, broadband data switch 250 would couple to the existing telephone wires at any location to switch enhanced services such as video information on top of the existing telephone wires. It may be desirable, however, to locate broadband switch 250 in the same wiring closet as telephone switch 220 to facilitate such connections.

Each modem/diplexer 241 through 243 can be located in an office or room in which the corresponding telephone is located and can be coupled to the telephone through normal telephone jacks for easy plug-in operation. Although modem/diplexers 251 through 253 are shown as incorporated into the switch, it is of course within the scope of the present invention to provide such modem/diplexers separate and apart from broadband data switch 250. Other variations and configurations are possible without departing from the scope of the invention.

In addition to being coupled to existing telephones 201 through 203, each modem/diplexer 241 through 243 is also coupled to a video device 221 through 223 which provides video, audio and data services to users associated with each telephone. One possible video device, shown in FIG. 3 and described in more detail below, is a video teleconferencing station including a computer and associated peripherals which allows each user to view full-motion video information. Using such a station, each user can place video telephone calls to one or more other users through broadband data switch 250 independently of the associated telephone. Each video teleconferencing station permits a user to bidirectionally transmit high quality video and audio information over telephone lines 230a to other users through broadband data switch 250. Other applications including video server applications and broadcast applications will also be described in more detail herein.

As shown in FIG. 2A, a modem/diplexer is provided for each user's telephone and plugged into the existing phone jack in each office. Each modem/diplexer unit splits the telephone signals from other broadband signals (e.g., video and data) and allows normal telephone signals to be passed without interference. In various embodiments, the modem/diplexer uses a narrowband FM modulation technique for transmitting video, but the invention is not limited in this respect. Two video signals can be provided (using roughly 6 MHZ per signal) to permit two-way videoconferencing between interoffice telephone sets. Each video signal can be provided in standard NTSC format (RS-170A). Data signals for video call set-up and the like can also be transmitted in the broadband portion of the spectrum.

In the embodiment of FIG. 2A, broadband data switch 250 includes a plurality of modem/diplexers 251 through 253, one per incoming telephone line. It also includes a video crosspoint switch 254, an audio crosspoint switch 255, and a data crosspoint switch 256. Each such switch is coupled to each modem/diplexer 251 through 253 such that any incoming telephone line 230a can be directly connected to another telephone line 230a independently of telephone switch 220. Although this switching arrangement is shown as using a bus 258 in FIG. 2A, the crosspoint switches can instead be directly wired to each modem/diplexer (i.e., video switch 254 having an input and an output wired to each modem/diplexer 251 through 253; audio switch 255 having an input and an output wired to each modem/diplexer 251 through 253; and data switch 256 having an input and an output wired to each modem/diplexer 251 through 253). Moreover, although the crosspoint switches are shown as separate units, they can of course be combined into a single switch. Finally, multiple modem/diplexers could be combined into a single plug-in card to fit in a chassis.

Although not necessary, each video signal can be switched at baseband frequencies. For example, the incoming half of each modem/diplexer in switch 250 downconverts signals to baseband frequencies for switching, and the outgoing half of each modem/diplexer in switch 250 upconverts baseband signals to the appropriate frequency band. For a two-way video conference, each modem/diplexer will simultaneously act as both an incoming and outgoing unit, albeit for two different signals. In that case, the incoming and outgoing signals will be transmitted in different frequency bands on telephone lines 230a to avoid interchannel interference.

Figure 4:
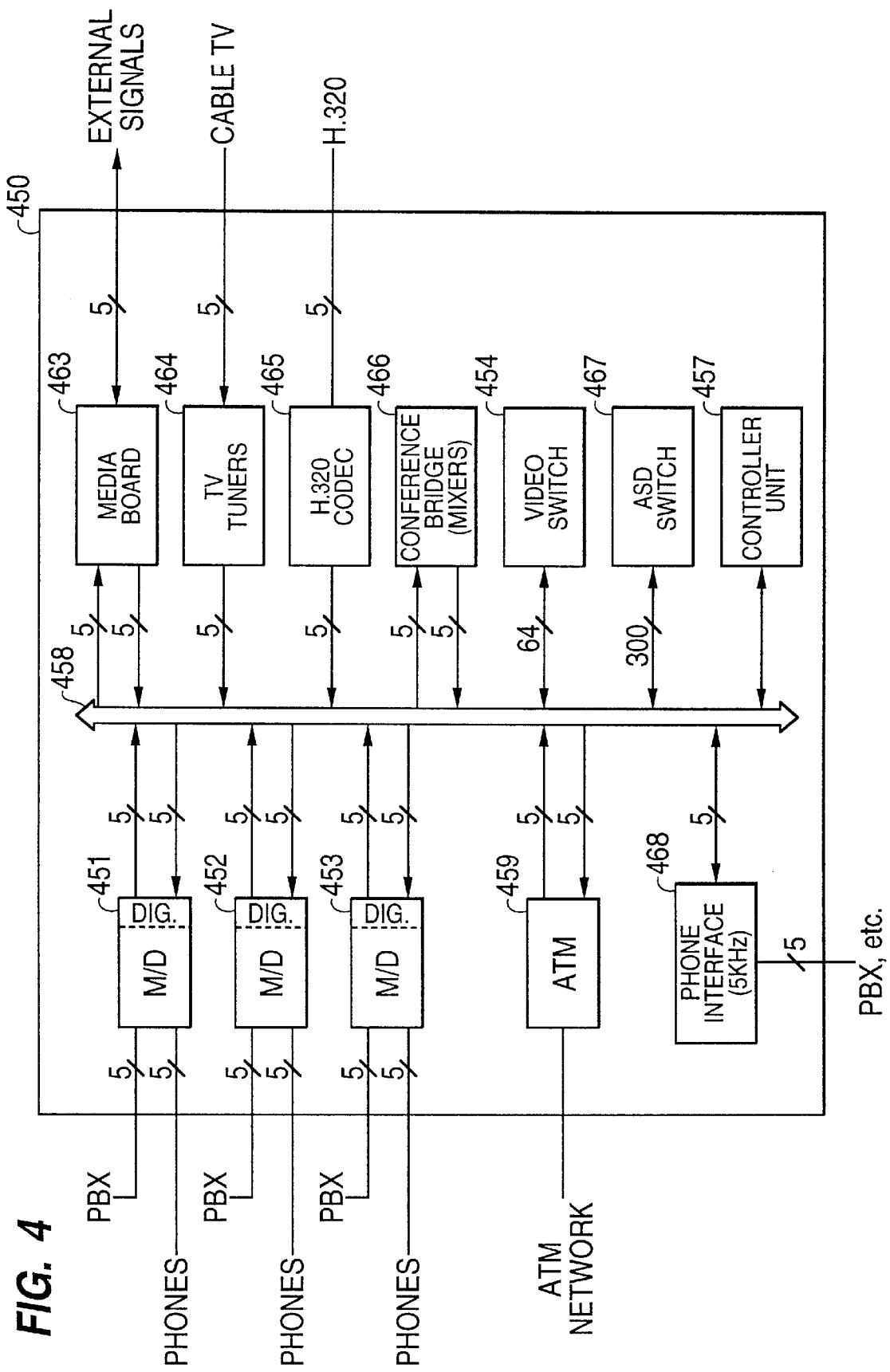
FIG. 4 shows additional details of one embodiment of a broadband data switch 450 according to the present invention.

In one embodiment, signals can be transmitted, received and switched in analog form. In another embodiment, signals can be transmitted, received and switched in digital form. Variations on this approach are also possible. As shown in FIG. 4, each modem/diplexer 451 can include digitizing circuitry which converts incoming analog signals into digital form for mixing and switching, and converts outgoing digital signals into analog form for transmission over the telephone lines. Other variations are explained with reference to FIGS. 2B and 2C.

Broadband data switch 250 also includes a controller unit 257 for controlling the overall operation of the switch and, in particular, commanding crosspoint switches 254 through 256. Other video sources such as broadcast television, VCRs, cameras, or any other type of video signal can be input to the crosspoint switches for subsequent connection to one of the telephone modem/diplexers 241 through 243. A video server 260 such as a PC-based server can also be provided to permit video retrieval applications. A codec 261 can be coupled to the video server to decompress compressed video stored on a disk 262.

Each modem/diplexer 251 through 253 in broadband data switch 250 preferably extracts data messages intended for controller 257 (i.e., those pertaining to video call set-up and completion) and transmits these messages to controller 257 over a bus. One technique for doing this is to store the incoming message in a local memory, generate an interrupt to controller 257, and have controller 257 read out the message over a bus 258.

High capacity fiber optic lines can also be connected to broadband data switch 250 to provide additional sources of high bandwidth data to desktops while retaining use of existing telephone lines. In this way, expanded capabilities can be provided to desktops at minimal expense.

The arrangement shown in FIG. 2A facilitates a variety of different video applications including: one-way video broadcast; two-way video conferencing; and retrieval of stored video data. In each of these applications, broadband data switch 250 receives a request to connect a video source to one or more users through crosspoint switches 254 through 256 and, under control of controller 257, the crosspoint switches effect the line-to-line connections through modem/diplexers 251 through 253. Each modem/diplexer 251 through 253 provides separate inputs and outputs for video, audio, and data channels which are independently switched.

Figure 2B:
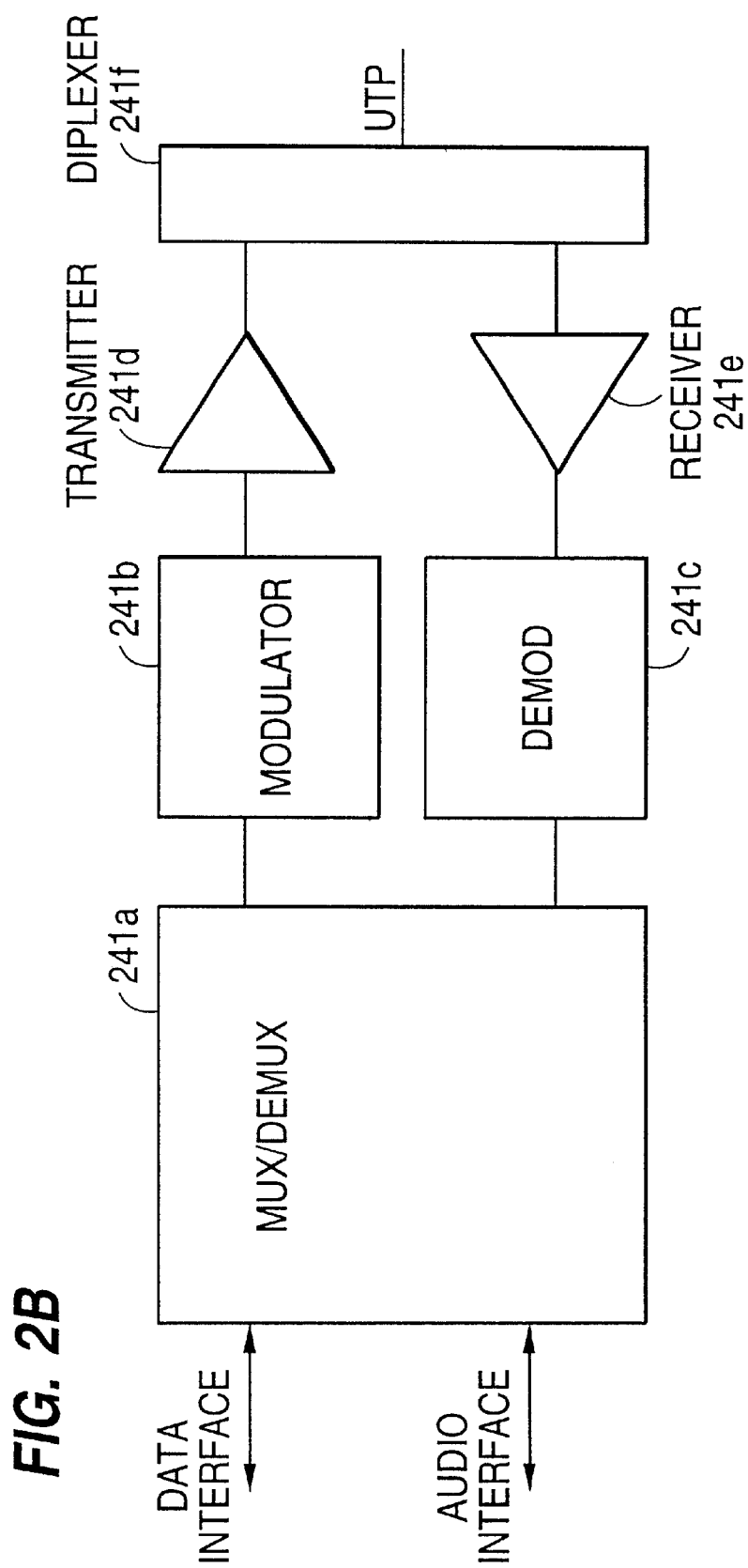
FIG. 2B shows an alternate embodiment for each modem/diplexer 241 shown in FIG. 2A.

FIG. 2B shows an alternate embodiment for each modem/diplexer 241 shown in FIG. 2A in which audio data is transmitted digitally, and FIG. 2C shows a frequency plan for an alternate embodiment of each modem/diplexer 241.

In FIG. 2B, audio data can be provided to each modem/diplexer in digital form, such as at a 48 Khz sampling rate using 16 bits per channel×2 channels for stereo audio. This results in an aggregate data rate of about 1.5 Mbits/sec for each direction of stereo audio data (incoming and outgoing).

Data can be multiplexed into this stream using mux/demux 241a, which is coupled to modulator 241b and demodulator 241c. The data could of course be compressed to reduce bandwidth. Any of various modulation techniques could be used such as QPSK, QAM, and the like. Transmitter 241d and receiver 241e are connected to diplexer 241f to couple the data signals to the telephone line.

FIG. 2C shows one possible frequency plan for transmitting bidirectional audio, video and message data (audio can be transmitted in the message data stream). As shown in FIG. 2C, existing voice-grade telephone signals can be transmitted from about zero to 2 MHZ; inbound data from about 2 MHZ to 5 MHZ; outbound data from about 5 MHZ to 8 MHZ; inbound video from about 8 MHZ to 15 MHZ; and outbound video from about 15 MHZ to 22 MHZ. Although not explicitly shown in FIG. 2C, appropriate guard bands should generally be included to avoid interference among signals.

Figure 3:
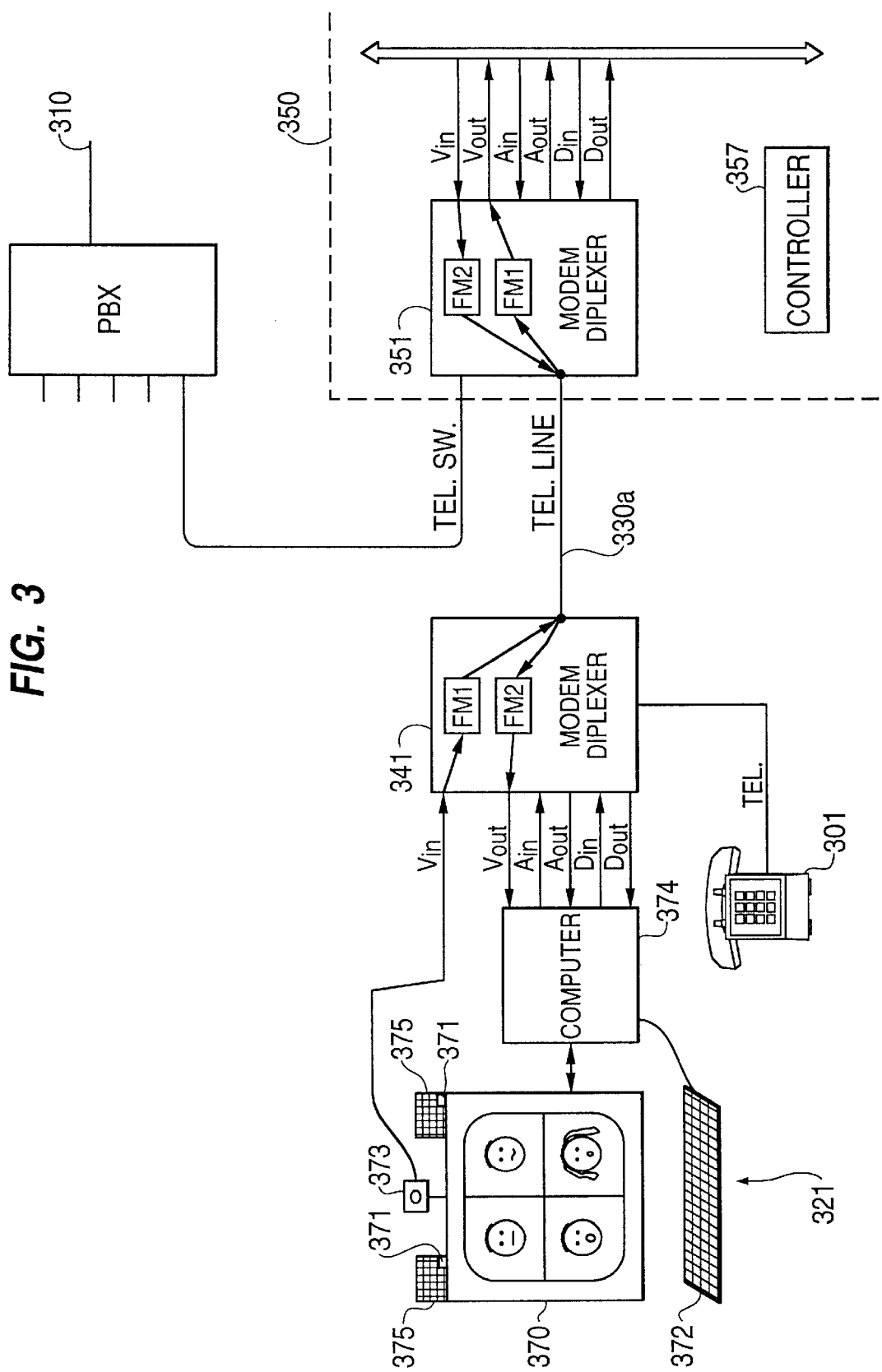
FIG. 3 shows one possible configuration for a desktop videoconferencing station 321 coupled to a modem/diplexer 341, wherein an existing telephone 301 is also coupled to the modem/diplexer 341.

FIG. 3 shows one possible configuration for a desktop videoconferencing station 321 in accordance with the invention. As shown in FIG. 3, existing telephone 301 is coupled to modem/diplexer 351 and can be located near station 321, such as on a user's desktop. Station 321 can include a computer 374, monitor 370, keyboard 372, microphones 371, video camera 373, and stereo speakers 375. Video camera 373 and microphone 371 may be combined into a single unit and, as is well known in the art, can be coupled to a frame grabber or other video card inserted into computer 374. The components can be provided separately in stand-alone form or partially incorporated into a desktop computer. Monitor 370 can be used to display video images for one or more other parties to a video telephone conference under the control of software executing in computer 374. As described in allowed U.S. application Ser. No. 08/352,112 (now U.S. Pat. No. 5,621,455), a scan converter can be used to convert standard NTSC video signals to RGB format used to drive a computer monitor.

As shown in FIG. 3, each modem/diplexer unit in various embodiments includes a video input port, a video output port, an audio input port (two channels), and audio output port (two channels), a data input port, and a data output port. Additionally, normal telephone type jacks can be provided for connecting to telephone 301 and telephone line 330a. In various embodiments, video data from camera 373 is frequency modulated to a first frequency band FM1 and video data from telephone line 330a is demodulated from a second frequency band FM2. Modem/diplexer 351 operates in the reverse manner (i.e., video data from camera 373 which is modulated at FM1 is demodulated from FM1 in modem/diplexer 351, whereas video data emerging from modem/diplexer 351 is modulated to frequency band FM2 and demodulated in modem/diplexer 341).

The arrangement of FIG. 3 operates essentially as follows. A user associated with telephone 301 and station 321 places a request for video services from station 321 in a data channel over existing telephone line 330a. This request goes through the user's modem/diplexer 341 to modem/diplexer 351 in switch 350 and is intercepted by controller 357 as a "call setup" request. Controller 357 thereafter causes the appropriate crosspoint switches (not shown) to be switched, thus connecting the user's telephone line 330a with another user's telephone line or a video source external to the telephone lines through modem/diplexer 351.

This arrangement does not interfere with existing telephone 301 because the telephone signals are contained within telephone signaling region T (see FIG. 1B) which are lower in frequency from the new video, audio and data signals provided by the present invention. Each modem/diplexer decouples the telephone signals from the new video, audio and data signals provided by the present invention, thus permitting existing telephones to be used without interference.

FIG. 4 shows additional details of one possible embodiment for a broadband data switch in accordance with the present invention. In the embodiment shown in FIG. 4, three modem/diplexer units 451 through 453 each support five communication channels, wherein a communication channel is defined as a pair of video signals (one video signal into the unit and one out of the unit); a pair of 16-bit digitized stereo audio signals (one stream into the unit and one out, where master clock and sync are provided by controller unit 457); and a pair of serial data signals (one into the unit and one out of the unit). Thus, each of the modem/diplexer units shown in FIG. 4 can connect to five separate telephone lines as well as five lines on the PBX to support full duplex communication for five users.

Also shown in FIG. 4 is a media board 463 which provides an interface between external signal sources (video cameras, VCRs, broadcast television, cable television, video servers and the like) and backplane 458. Media board 463 performs routing of external video, audio and/or serial data signals to backplane 458 which allows any of these external sources to be connected to any user by converting the signals to an appropriate backplane signal format type and then routing these signals through one or more modem/diplexer units 451 to 453. Similarly, signals from a user's desktop can be routed through one of the modem/diplexers 451 to 453 through media board 463 to an external video sink such as a VCR.

A TV tuner board 464 can also be provided within broadband data switch 450 for connection to a cable television source. The input broadcast television signal is split into 5 separate signals, one for each tuner. In various embodiments, TV tuner board includes a signal splitter and 5 separate TV tuners each of which can independently tune to a different channel based on commands received from controller unit 457. These commands can be generated by individual users at teleconferencing stations such as those shown in FIG. 3. The TV signals can be forwarded to individual user's desktops over existing telephone lines through modem/diplexers 451 through 453. This allows each user to watch a broadcast or cable TV program at his desk over existing telephone lines and tune to any of various stations.

Audio signals can be provided as serial streams of digitized stereo audio. Left and right audio are both digitized into 16-bit words and shifted out most significant bit first and left channel first. Timing can be provided by signals on backplane 458 based on a 11.2896 MHZ clock and synchronization pulse, wherein the sync pulse is used to indicate the start of the audio left channel.

An H.320 compliant coder/decoder (codec) board 465 can be provided which converts the standard NTSC video and other signals into H.320 format for transmission to other systems. Such boards can be obtained from Mentec, Ltd. (Ireland) or Zydachron Inc. (New Hampshire, U.S.A.).

A conference bridge board 466 accepts multiple communication channel inputs, mixes one or more of them together, and provides a mixed output. This allows each user in a multi-party conference call to see and hear other parties simultaneously. Video is "mixed " by tiling windows (see FIG. 3) on the output, each with one of up to four video inputs. Audio is mixed by simple addition of inputs to be merged. Data is mixed by transmitting a copy of each packet to other parties in a teleconference.

In certain embodiments, each user is only provided with mixed video and audio from other parties to a video teleconference, but is not provided with his own video and audio. Thus, for example, if there are three parties to a video teleconference, each user will only see and hear the other two parties on his display but not himself. Other embodiments of the invention include providing video feedback of each user to himself.

Figure 5:
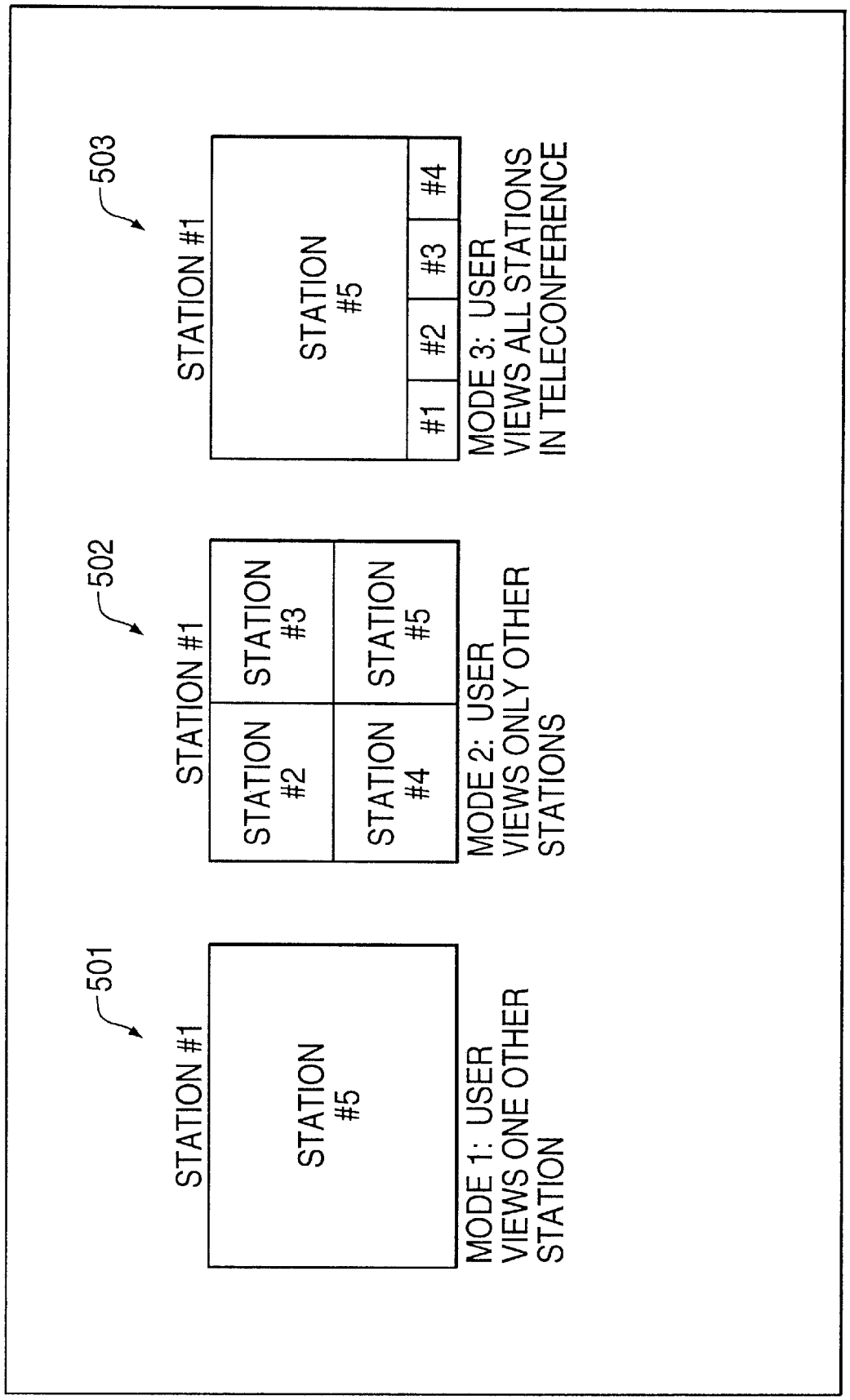
FIG. 5 shows three different video merge modes which allow a user to view one or more parties to a video teleconference.

FIG. 5 shows at least three different modes which can be provided to implement the above described features. In a first mode 501, a user at station #1 is provided with a video screen image of one of the other parties to a video teleconference, in this case station #5. In a second mode 502, the user at station #1 is provided with a "tiled " image constituting the other parties to the video teleconference, in this case stations 2 through 5. In a third mode 503, the user at station #1 is provided with a split screen image constituting all stations participating in the teleconference, including the user himself at station #1. As shown at 503, this mode may further provide for an enlarged image of one of the participants and a smaller image of the remaining participants.

The second mode image 502 may be constructed by dropping every other pixel and every other line to perform a size reduction. The third mode image 503 may be constructed by dropping three of every four pixels to perform image size reduction.

Figure 6:
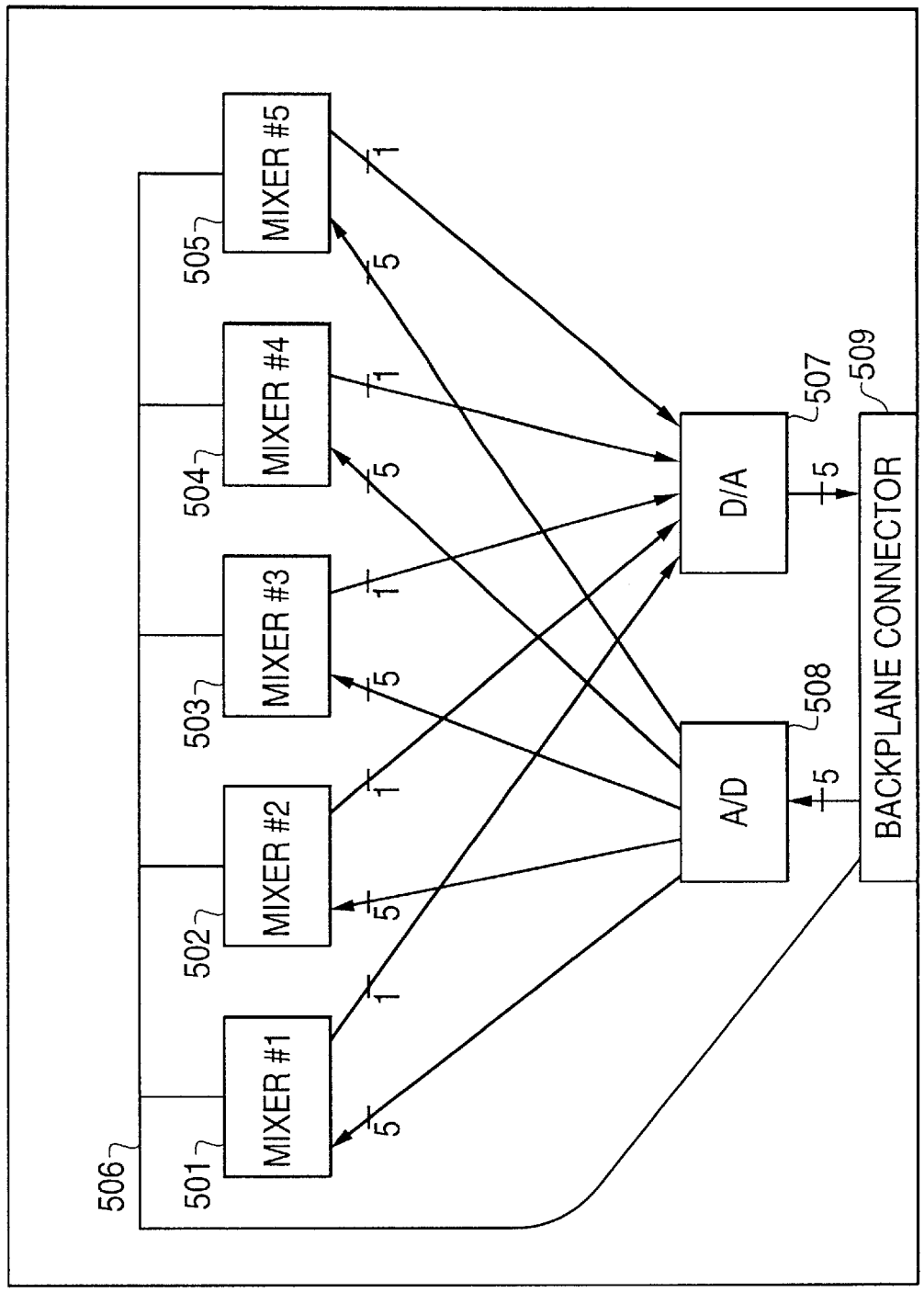
FIG. 6 shows details of one possible embodiment of a conference bridge board according to the present invention.

FIG. 6 shows one possible embodiment of a conference bridge board 566 in accordance with the present invention. As shown in FIG. 6, a plurality of mixers 501 through 505 are coupled by way of a control bus 506 which allows each mixer to be commanded by controller 257. Each mixer mixes video, audio, and data signals, preferably in digital form (note analog to digital converter 508 and digital to analog converter 507), although the invention is not limited in this respect. Each mixer has access to channels from the backplane 509, performs the appropriate mixing, and produces an output back to the backplane. In various configurations, all video signals entering and leaving the conference bridge board are in analog NTSC format, although digital formats can also be used.

The conference bridge board can be "hardwired " so that inputs and output go to the correct places. For example, mixer #1 can be hardwired to communication channels 2 through 5 and provide an output to communication channel 1; mixer #2 can be hardwired to communication channels 1 and 3–5 and provide an output to communication channel 2; and so forth.

Video signals can be mixed digitally by alternately sampling each digital video frame from each source to construct a new video frame that includes portions of each input frame. See explanation of FIG. 5 above.

Audio mixing can be accomplished in a manner analogous to video mixing. Incoming audio signals from each party to a teleconference are added together to form a composite output. For a five person teleconference, for example, the first person is assigned a mixer which mixes audio samples from each of the other four parties and provides this output to the first person. In various embodiments, the first person's audio is not mixed with the other four parties.

One way of mixing the serial data is to use a serial port on a CPU for each incoming data channel. Each incoming data packet has a destination address. If a packet has a destination indicating a broadcast (e.g., all other parties to a teleconference), then the CPU transmits a copy of the packet to all ports that are a party to that teleconference. If a packet is intended for only one other party, then no mixing occurs (i.e., it is sent only to the one destination). In various embodiments, data switch 450 is always considered a "party " to a teleconference.

As explained previously, the audio and even video data can be provided in analog or digital form. If audio data is transmitted digitally between modem/diplexers, there would be no need to digitize the audio data after it is demodulated and thus the audio data could be directly provided to ASD switch 467 which could comprise a digital crosspoint switch set up by controller 457. ASD switch 467 could be implemented as an ASIC if desired.

Referring again to FIG. 4, communication between each board such as the conference bridge board and controller unit 457 can be effected over an RS-485 asynchronous serial multipoint bus. Address and data can be transmitted at 125KBaud, and all transactions can be initiated by controller unit 457 by sending a specific address. All ports on the bus watch for an address byte and, when detecting their address, collect the command and, if a response is required, respond with the response or an indication that a response will be forthcoming. Controller unit 457 can poll all ports to identify the types of cards installed and to determine whether a particular card requires servicing. To simplify and speed up polling of the system, each board has a specific pin on the backplane connector that the board pulls low to indicate its presence. Controller unit 457 is able to read these pins from all of the boards and thus query only those slots that actually have boards in them.

Controller unit 457 provides control over the other cards in data switch 450. It controls routing information between the cards, maintains and displays status and routing information to users, and repeatedly polls the other cards in data switch 450 to maintain a profile of the system configuration. In various embodiments, controller unit 457 also performs the switching of serial data signals. Additionally, controller unit 457 can communicate with remote modem/diplexer units using a data channel over the telephone lines. Additionally, it can provide status information to an external terminal through an RS-232 connection or an Ethernet port.

Video switch 454 connects any input video channel to any other output video channel, for a total of 64 channels. The video switching can be accomplished using an analog crosspoint matrix. As one example, a chip by Maxim which provides an 8 by 8 crosspoint matrix can be used. In one such configuration, 64 of such chips can be used to form video switch 454. Alternatively, a 16 by 16 crosspoint matrix by Analog Devices, Inc. can be used, which would reduce the chip count significantly.

Audio/serial data switch 467 supports 100 digital audio input signals, 100 digital audio output signals, and 100 serial data output signals. The audio switching can be implemented using two 64 by 64 crosspoint matrices. Other switching techniques can of course be used. Because digital switches can be implemented much more efficiently than analog video crosspoint switches, a larger number of channels can be switched concurrently (see FIG. 4).

Phone interface 468 allows external telephone lines to be connected into the data switch such as through a PBX or directly via external lines. This allows, for example, a conference call with a party on an external phone line having only the limited 5 Khz bandwidth. Phone interface 468 converts the normal incoming analog audio signals into digital format which can be routed through conference bridge 466 and/or through modem/diplexers 451 through 453 (and vice versa). In this manner, multiple parties within the office could be provided with video and high quality audio data while the externally connected party would be connected using lower quality audio only.

Three applications will now be described which make use of the inventive system: (1) one-way video broadcast; (2) two-way video conferencing; and (3) retrieval of stored video data. Other applications can be based on one or more of these three.

Figure 7A:
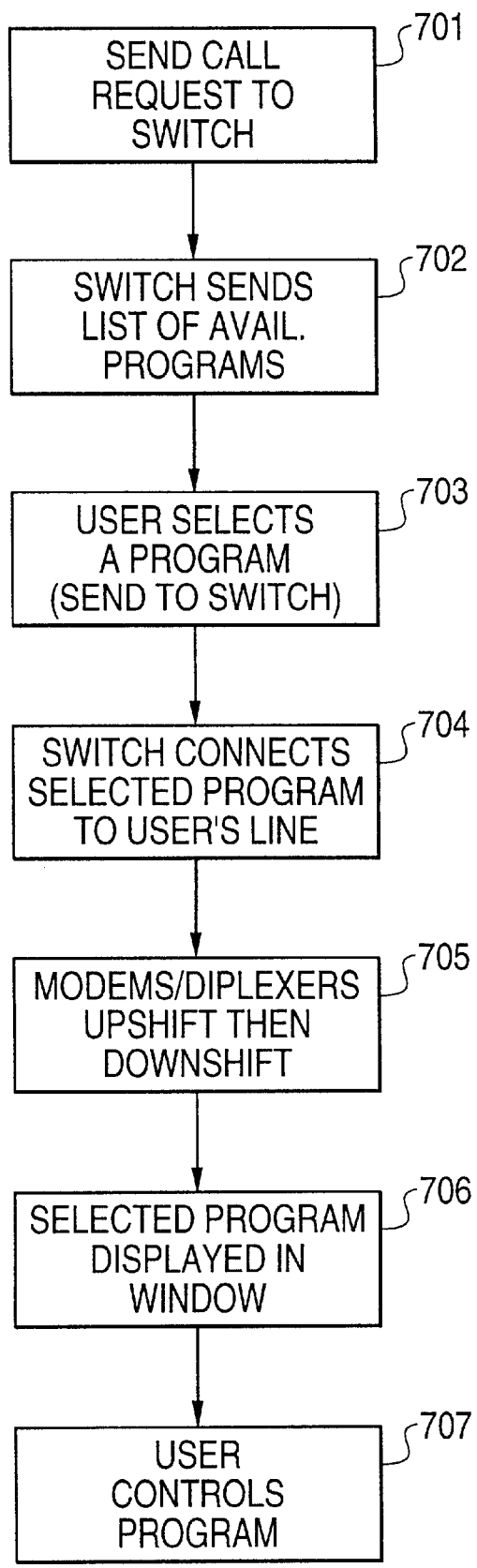
FIG. 7A shows steps which can be carried out to implement a one-way video broadcast application in accordance with the present invention.

FIG. 7A shows various steps which can be performed to accomplish a one-way video broadcast application. Referring briefly to FIG. 2, it is assumed that software executing in video device 221 communicates with controller 257 to effect channel set-up and break down over the two-way data channel through modem/diplexers 241 and 251. The detailed description provided below thus corresponds to steps which can be performed by software operating on video device 221 and controller 257. It is also assumed that video information is available either from video server 260 or from one of the external video sources such as broadcast TV, security camera, or the like.

Beginning with step 701, upon user request video unit 221 transmits a video request to switch 250 over telephone line 230a using a data channel. This request is transmitted over the data channel through modem/diplexer 241, through modem/diplexer 251, and is received in controller 257. Next, in step 702, controller 257 transmits a list of available programs (e.g., those available on video server 260, and/or those other sources of video information) back to video device 221 again over the return communication channel. This list may be displayed on a computer display such as monitor 370 of FIG. 2. Rather than requesting such a list from switch 250 each time, the user's video unit 221 can instead be provided with a list at system initialization time or such a list can be periodically broadcast from switch 250.

In step 703, the user selects one of the displayed programs and the selection is sent to switch 250 again over a data channel in telephone line 230a. Then, in step 704, the switch (through controller 257) commands video switch 254, audio switch 255, and/or data switch 256 to switch the selected program to the user's telephone line. Referring briefly to FIG. 4, if the user has selected a television broadcast, this would include the step of controlling the TV tuner board 464 to tune to the selected channel. As described previously, switching can be accomplished at baseband frequencies (e.g., video signals in NTSC format from 0 to about 6 MHZ).

In step 705, modem/diplexer 251 "upshifts " the baseband video signal to an outgoing frequency band (for example, centered at about 9 MHz), and modem/diplexer 241 "downshifts " the modulated video signal back to baseband for display on video unit 221. If conversion between NTSC and RGB format is required, a scan converter or other adapter can be provided to perform the conversion.

In step 706, the selected video program is displayed in a window on the user's display. In step 707, the user may interactively control the program depending on its content. For example, if the program is a broadcast television channel, the user may change the channel, volume, and the like. If the program is from a camera, the user may control the tilt, rotation, picture, and the like (see FIG. 7C). If the program is from a VCR, the user may start, stop, pause, fast forward, and the like. All of these commands can be transmitted through the data channel over telephone line 230a.

Figure 7B:
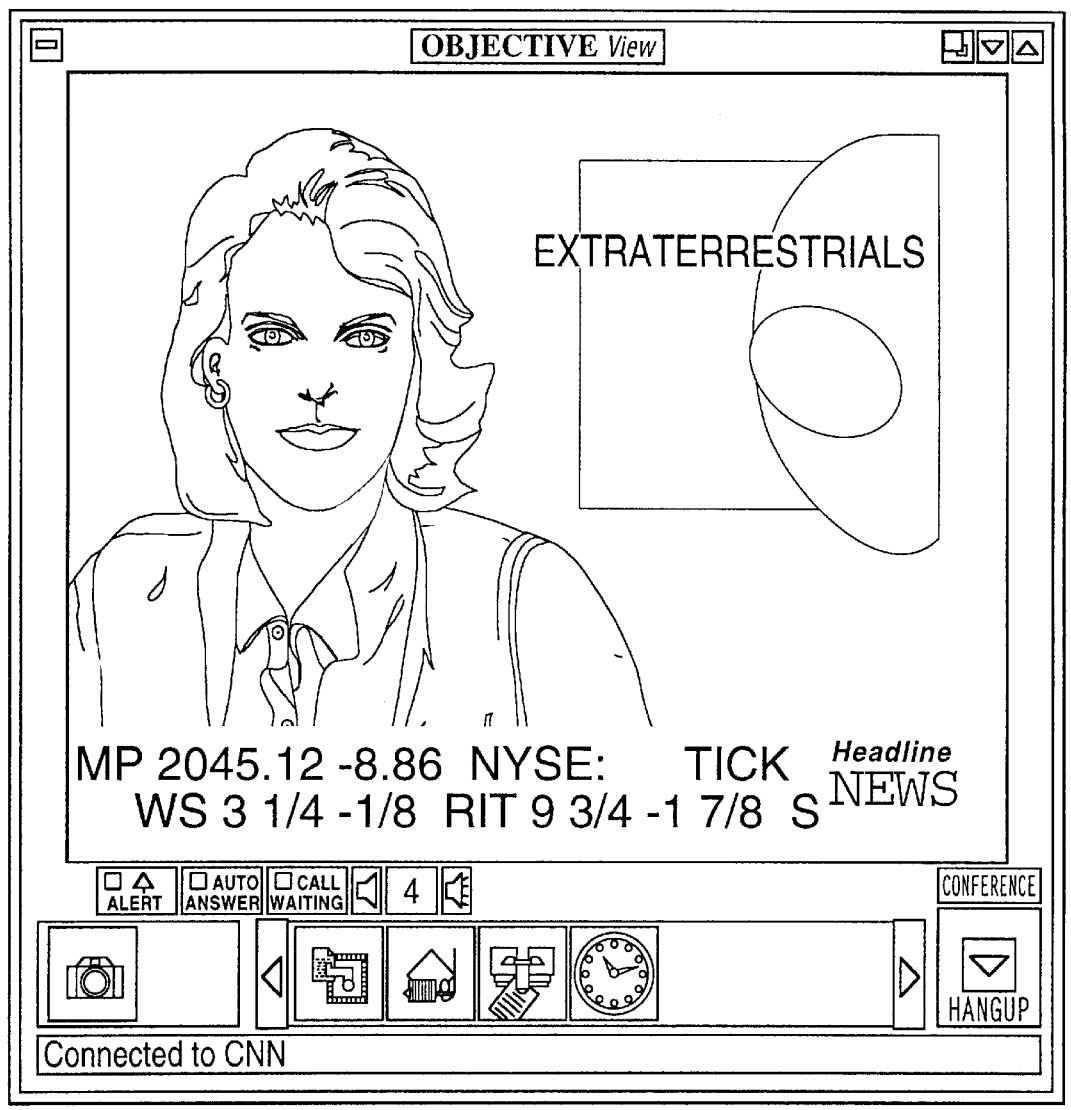
FIG. 7B shows one possible user interface for implementing the steps of FIG. 7A.

FIG. 7B shows one possible user interface which can be used for implementing the steps of FIG. 7A. As shown in FIG. 7B, a broadcast TV program is provided in a window on the user's displayable screen area with various controls.

Figure 7C:
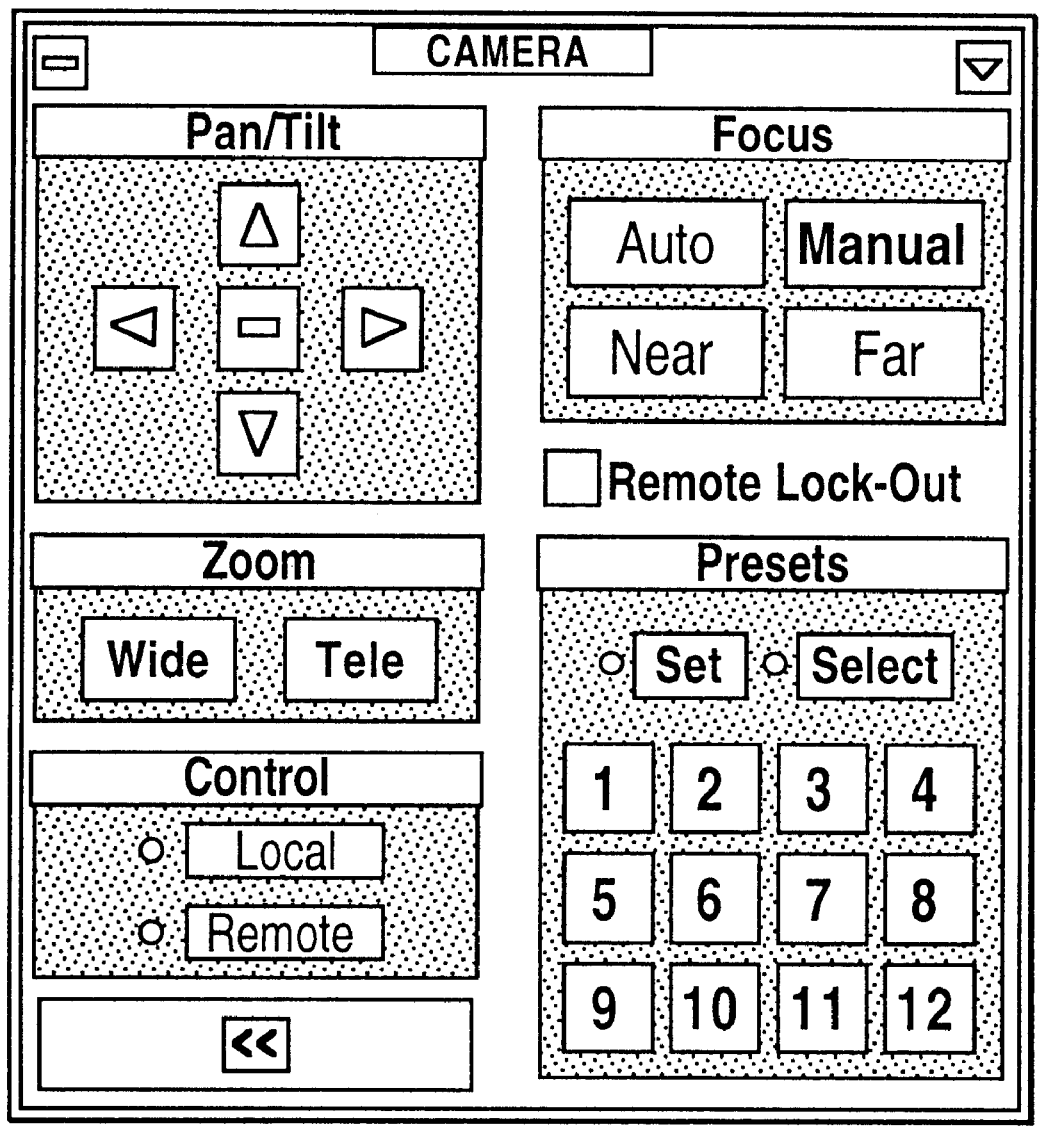
FIG. 7C shows one possible user interface for controlling a camera.

FIG. 7C shows a display for a user-controlled remote control camera which can be provided on each user station. When a remote control camera is enabled, each user can be provided with controls to change the pan, tilt, zoom, and camera selection (i.e., control local camera or remote camera). Additionally, depending on camera capabilities, controls for manual or automatic focus can be provided. A remote lock-out feature can be provided to prevent a remote user from controlling the local user's camera. A "preset" feature can also be provided with allows a user to preset and save various camera positions. User controls for camera settings such as camera movement step size, duration, and the like can also be provided. Each of the aforementioned controls can be transmitted as messages in the data channel.

Figure 8A:
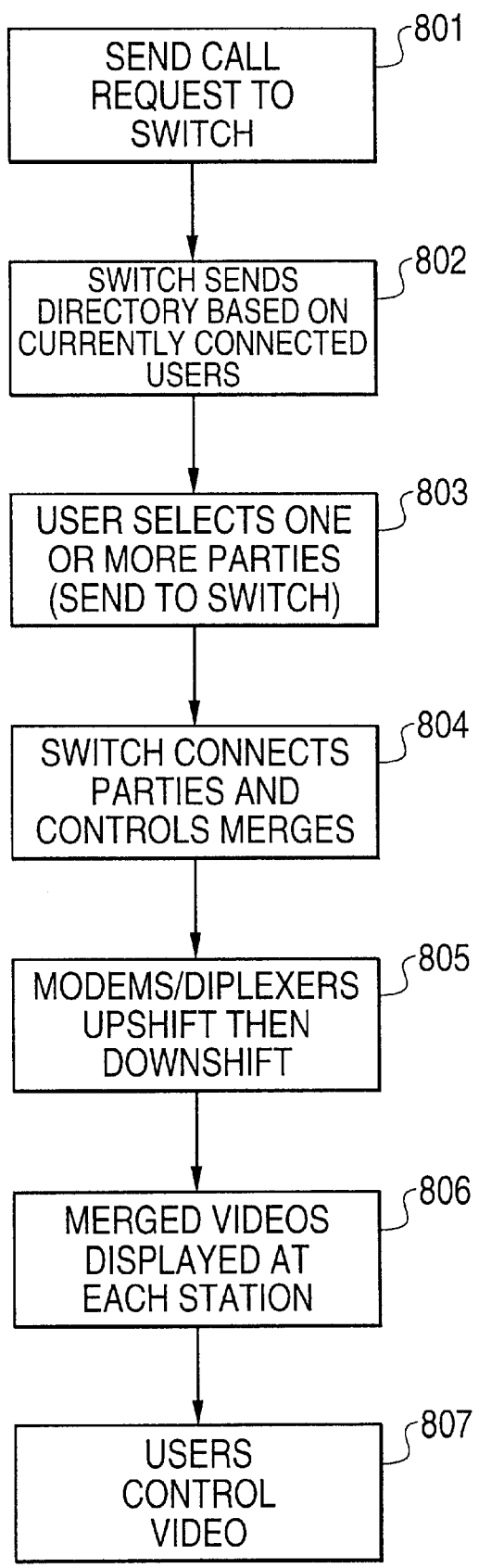
FIG. 8A shows steps which can be carried out to implement a two-way video conference application in accordance with the present invention.

FIG. 8A shows steps which can be performed to carry out a two-way video application such as a video teleconference between two or more people. Beginning in step 801, a user at his video unit 221 places a "call" request, which is transmitted to switch 250. This request is transmitted through diplexer/modem 241 to data switch 250 over a data channel on telephone line 230a. Thereafter, in step 802, data switch 250 returns a list of available persons or parties. This list can be based on those parties who are presently connected into the system, such that unavailable persons would not be listed. A "phone book" type format can be used. It is of course possible to instead store such a phone list at each user's station, or to periodically broadcast a list of currently available parties.

Next, in step 803, the user selects one or more parties and this selection is transmitted to switch 250. If more than one party is selected, a tiled window can be created on the user's display according to one of the modes shown in FIG. 5. Other approaches are of course possible.

In step 804, switch 250 connects the selected users together via switches 254, 255 and 256, and additionally controls conference bridge 466 to merge images together where necessary. If only two parties are connecting, merging may not be necessary (i.e., each party only views an image of the other party). If three or more parties are connecting, merging can be used to allow each party to view all the other parties and, if desired, the caller himself.

In step 805, each modem/diplexer combination upshifts and downshifts the incoming and outcoming video between an appropriate frequency band and baseband. For example, referring to FIG. 2, if the user at telephone 201 is connecting to the user at telephone 203, modem/diplexer 241 would upshift video from a camera at video station 221 for transmission across line 230a; modem/diplexer 251 would downshift this signal to baseband for switching in video switch 254; modem/diplexer 253 would upshift this signal for transmission across line 230a towards user 203; and modem/diplexer 243 would downshift this signal for display on video unit 223. Similarly, the video from a camera at video station 223 would be upshifted by modem/diplexer 243 for transmission to switch 250; modem/diplexer 253 would downshift this signal to baseband for switching through video switch 254; modem/diplexer 251 would upshift this baseband signal for transmission to user 201; and modem/diplexer 241 would downshift this video signal for display on unit 221. For more than two parties, merging can occur in conference bridge board 466 prior to switching.

In step 806, the merged video signals are displayed at each user's video station, preferably in a window. Finally, in step 807, each user can control certain aspects of the video display such as picture size, selection of which parties are displayed, and the like. Such control causes commands to be transmitted to switch 250 which controls the video switching and merging operations.

Figure 8B:
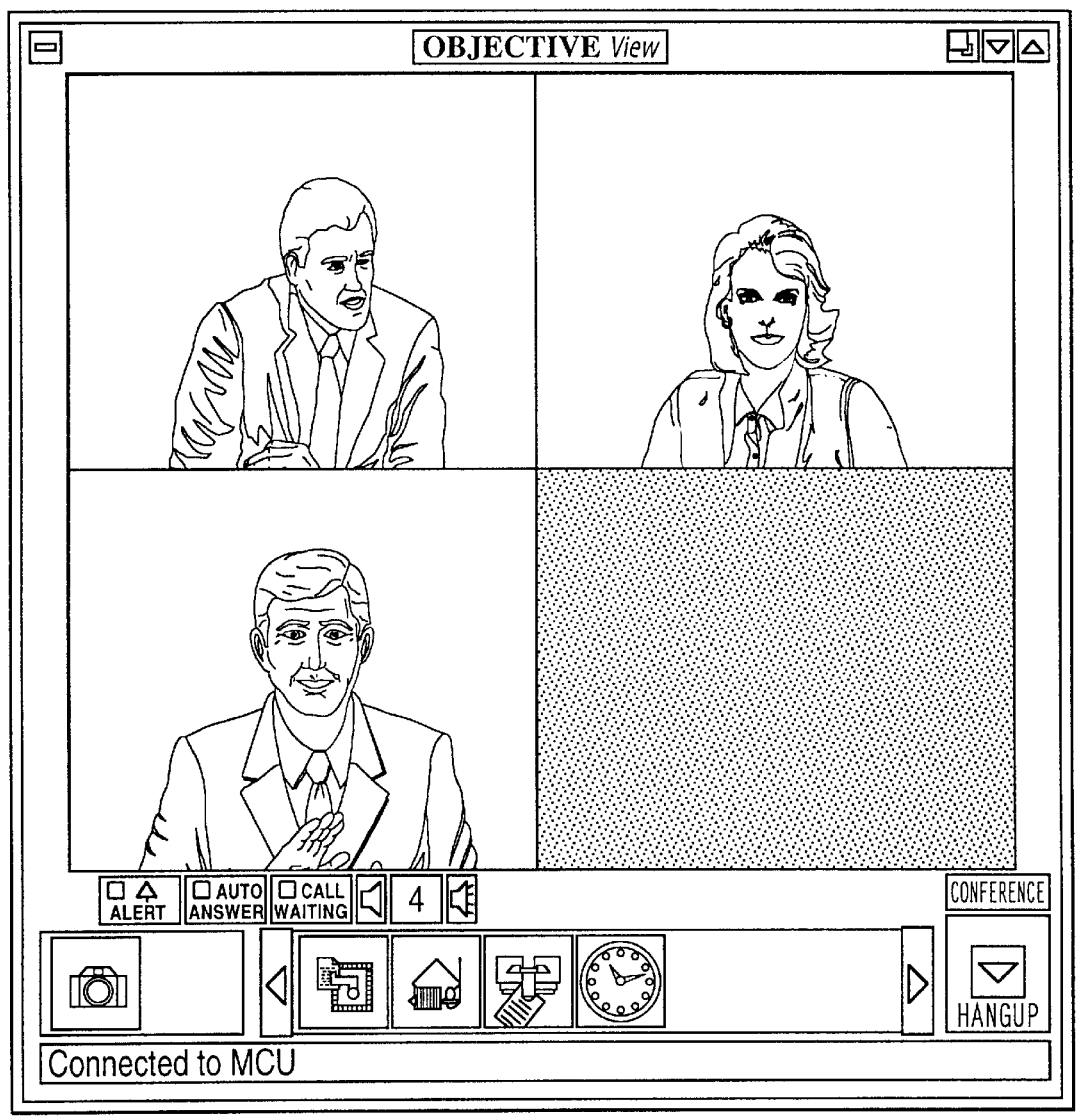
FIG. 8B shows one possible user interface for implementing the steps of FIG. 8A.

FIG. 8B shows one possible user interface for implementing the steps of FIG. 8A. As shown in FIG. 8B, three full-motion video images received from three other video conference call participants are provided in a display area on the user's computer display. Additionally, controls such as for controlling cameras associated with each user can be provided (see FIG. 7C).

Figure 9A:
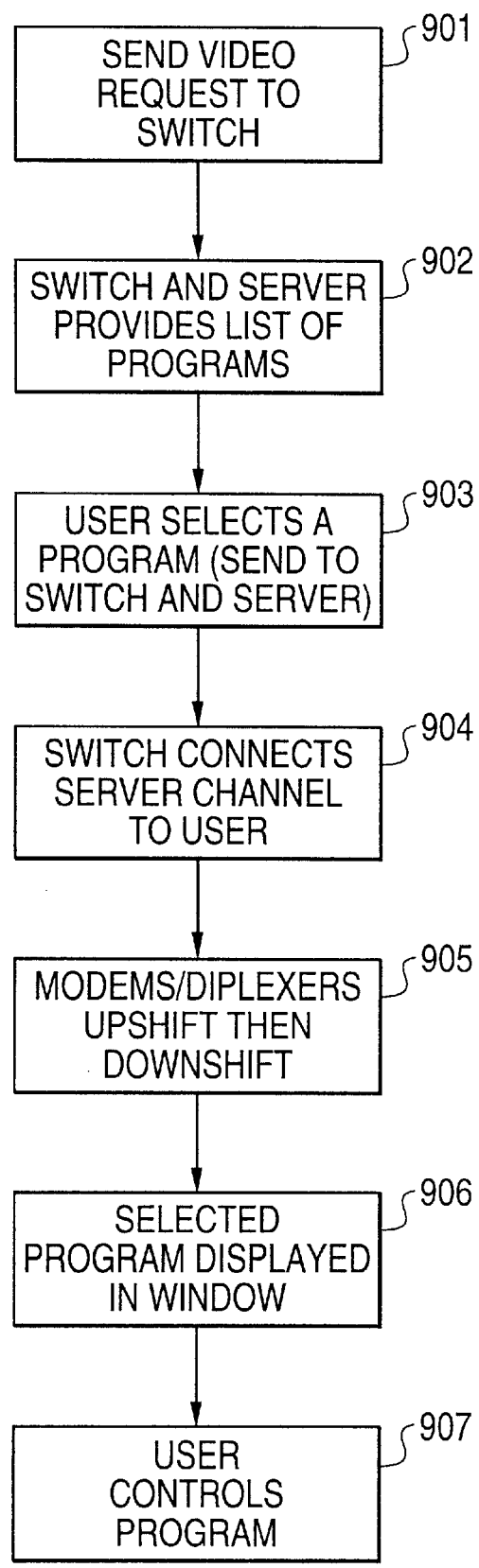
FIG. 9A shows steps which can be carried out to implement a video retrieval application in accordance with the present invention.

FIG. 9A shows steps which can be performed to carry out a video retrieval application, such as watching an instructional video or movie. The steps are similar to those shown in FIG. 7A (one-way video application) but can include additional steps for interacting with a video server such as server 260 in FIG. 2.

Beginning in step 901, the user sends a request for a video program to switch 250. In step 902, the switch determines that the request is for a program from server 260 and transfers the request to the server. Video server 260 can be any of a variety of well known video servers and can be implemented with a personal computer and hard disks on which programs are stored in compressed format. (In one embodiment, a plurality of video servers 260 is provided, each comprising a dedicated personal computer for serving a single user). Video server 260 returns a list of available programs to switch 250, which returns this list to the user.

In step 903, the user selects one of the programs and this selection is transmitted to switch 250, which passes the request on to video server 260 to start playback of the selected program. In step 904, switch 250 also switches the appropriate server channel to the user's telephone line. For compressed video programs, codec 261 decompresses the program as it is played back.

In step 905, the decompressed video program is transmitted through modem/diplexers 251 and 241, wherein modem/diplexer 251 upshifts the decompressed video program and modem/diplexer 241 downshifts the decompressed video program to baseband for display on unit 221. Thereafter, in step 906, the decompressed video program is displayed on unit 221 such as in a window. Finally, in step 907 the user may control various aspects of the program such as changing the volume, stopping or pausing the video, fast forward, etc. Such controls are passed from switch 250 to video server 260 for appropriate action.

Figure 9B:
FIG. 9B shows one possible user interface for implementing the steps of FIG. 9A.

FIG. 9B shows one possible user interface which can be provided for implementing the steps described in FIG. 9A.

It is apparent that many modifications and variations of the present invention are possible, and references to specific values are by example only.

Reference numerals in the appended method claims identifying steps are for convenience only and are not intended to imply a necessary ordering of the steps. It is apparent that the method steps of the invention may be practiced in a different ordered sequence from that illustrated without departing from the scope of the invention. It is, therefore, to be understood that within the scope of the appended claims the invention may be practiced otherwise than as specifically described.

What is claimed is:

1. A system for providing video services over twisted pair telephone lines comprising:

a first plurality of video interface units each comprising a telephone port adapted to be coupled to a telephone, a video output port, and a telephone line port adapted to be coupled to twisted pair telephone line, wherein each of the first plurality of video interface units passes ordinary telephone signals between its telephone port and its telephone line port, and demodulates modulated video data present at its telephone line port and provides the demodulated video data to its video output port;

a second plurality of video interface units each comprising a telephone line port adapted to be coupled to one of the first plurality of video interface units through twisted pair telephone line, a telephone switch port adapted to be coupled to a telephone switching unit which connects telephone lines, and a video input port for receiving a video signal, wherein each of the second plurality of video interface units passes ordinary telephone signals between its telephone switch port and its telephone line port and modulates video data present at its video input port and provides the modulated video data to its telephone line port without interfering with ordinary telephone signals; and a computer controlled switch coupled between one of the second plurality of video interface units and a first video signal source and which in response to receiving a video connection request from one of the first plurality of video interface units over a corresponding telephone line causes a first video signal to be switched to the video input port of one of the second plurality of video interface units and thereafter to be transmitted in modulated form over the corresponding telephone line.

2. The system of claim 1, wherein each of the first plurality of video interface units further comprises a video input port, wherein each of the first plurality of video interface units modulates video data present at its video input port and provides the modulated video data to its telephone line port without interfering with ordinary telephone signals; and wherein each of the second plurality of video interface units further comprises a video output port, wherein each of the second plurality of video interface units demodulates modulated video data present at its telephone line port and provides the demodulated video signal to its video output port.

3. The system of claim 2, further comprising:

a video camera coupled to the video input port of one of the first plurality of video interface units to transmit full-motion color video data; and a computer display device coupled to the video output port of the one video interface unit to display full-motion color video data received over the twisted pair telephone lines.

4. The system of claim 3, wherein each of the first plurality of video interface units frequency modulates video data present at its video input port to a first frequency band; and wherein each of the second plurality of video interface units frequency modulates video data present at its video input port to a second frequency band different from the first frequency band.

5. The system of claim 1, wherein the computer controlled switch connects a video output port from another of the second plurality of video interface units to the video input port of the one video interface unit in response to receiving the video connection request from a user making a video-conference call.

6. The system of claim 1, wherein each of the second plurality of video interface units modulates stereo audio data onto its telephone line port into a frequency band separate from the modulated video data; and wherein each of the first plurality of video interface units demodulates modulated stereo audio data present at its telephone line port and provides the demodulated audio data to an audio output port.

7. The system of claim 1, further comprising a conference bridge which mixes three or more video signals into a mixed video signal;

wherein the computer controlled switch causes the mixed video signal to be switched to the video input port of one of the second plurality of video interface units.

8. The system of claim 7, wherein the conference bridge provides a plurality of viewing modes each of which causes a different display representation for a video conference call.

9. The system of claim 1, wherein the first video signal source comprises a TV tuner.

10. The system of claim 1, wherein the first video signal source comprises a video server.

11. The system of claim 1, further comprising a crosspoint video switch which connects two of the second plurality of video interface units.

12. A broadband switching system, comprising:

a first plurality of twisted pair telephone wires, each pair associated with one of a plurality of voice grade telephones;

a first plurality of signal modems each coupled between one of the plurality of voice grade telephones and a corresponding one of the first plurality of twisted pair telephone wires, wherein each of the first plurality of signal modems modulates and demodulates broadband signals on the corresponding one of the first plurality of twisted pair telephone wires in frequency bands outside the normal voice telephone range;

a second plurality of twisted pair telephone wires, each pair terminating at a voice grade telephone switch which connects two or more of the second plurality of twisted pair telephone wires in response to users making telephone calls from one of the plurality of voice grade telephones;

a second plurality of signal modems each coupled between one of the first plurality of twisted pair telephone wires and the telephone switch through one of the second plurality of twisted pair telephone wires, wherein each of the second plurality of signal modems modulates and demodulates broadband signals on a corresponding one of the first plurality of twisted pair telephone wires in frequency bands outside the normal voice telephone range; and a broadband data switch coupled between the second signal modems and a broadband signal source and which in response to receiving a broadband connection request over one of the first plurality of twisted pair telephone wires connects a broadband signal having a frequency bandwidth greater than that normally provided to the plurality of voice grade telephones to one of the second plurality of signal modems and thereafter causes the broadband signal to be transmitted over one of the first plurality of twisted pair telephone wires.

13. The system of claim 12, wherein the broadband data switch switches a first broadband signal output from one of the second plurality of signal modems to another of the second plurality of signal modems.

14. The system of claim 13, wherein the first broadband signal comprises a full-motion color video signal.

15. The system of claim 14, wherein the first broadband signal further comprises a stereo audio signal corresponding to the full-motion color video signal.

16. The system of claim 15, wherein the first broadband signal further comprises a message data signal.

17. A method of providing broadband data service over unshielded twisted pair (UTP) telephone wires, comprising the steps of:

(1) providing a first plurality of broadband signal modems each of which connects between a telephone and UTP telephone wires, and which modulates and demodulates broadband data signals over the UTP telephone wires without interfering with telephone signals on such wires;

(2) providing a second plurality of broadband signal modems each of which connects between an existing telephone switch and one of the first plurality of broadband signal modems, and which modulates and demodulates broadband data signals over the UTP telephone wires;

(3) providing a broadband data switch coupled between two or more of the second plurality of broadband signal modems; and (4) controlling the broadband data switch to selectively couple two or more of the second plurality of broadband signal modems in such a manner that a broadband signal communication path is established between at least two of the first plurality of signal modems over the UTP telephone wires.

18. The method of claim 17, wherein step (4) comprises the step of controlling the broadband data switch to establish a bidirectional video communication path between two of the first plurality of broadband signal modems.

19. The method of claim 17, wherein step (4) comprises the step of mixing broadband signals from two or more sources.

20. The method of claim 19, wherein step (4) comprises the step of mixing video signals from two users each associated with one of the telephones.

21. The method of claim 18, wherein step (4) comprises the step of receiving a video connection request through a data channel on the ordinary twisted pair telephone wires and, in response thereto, switching a first video signal received from one of the first plurality of signal modems to another of the first plurality of signal modems.

22. A broadband data switch for use in a system which includes a telephone switch, the broadband data switch comprising:

a first signal modem which connects to the telephone switch and to a first telephone line over which telephone calls are transmitted, wherein the first signal modem passes telephone call signals between the telephone switch and the first telephone line, and wherein the first signal modem demodulates a first modulated broadband signal present on the first telephone line and generates as an output a demodulated version of the first modulated broadband signal;

a second signal modem which connects to the telephone switch and to a second telephone line over which telephone calls are transmitted, wherein the second signal modem passes telephone call signals between the telephone switch and the second telephone line, and wherein the second signal modem receives as an input a first broadband input signal, modulates the first broadband input signal and injects a modulated version of the first broadband input signal onto the second telephone line in a frequency location which does not interfere with the telephone call signals; and a computer controlled switch coupled between the first signal modem and the second signal modem which, in response to receiving a broadband connection request, couples the output of the first signal modem to the input of the second signal modem, such that broadband communication between the first and second telephone lines is effected.

23. The broadband data switch of claim 22, wherein the first modulated broadband signal comprises a frequency modulated color video signal, and wherein the demodulated version of the first modulated broadband signal comprises a baseband color video signal.

24. The broadband data switch of claim 23, wherein the computer controlled switch receives the broadband connection request from a data channel present on the first telephone line.

25. The broadband data switch of claim 23, wherein the first signal modem further demodulates a first modulated audio signal present on the first telephone line and generates as an output a demodulated version of the first modulated audio signal;

wherein the second signal modem further receives as an input a first audio signal, modulates the first audio signal and injects a modulated version of the first audio signal onto the second telephone line; and wherein the computer controlled switch couples the demodulated version of the first modulated audio signal to the first audio signal input to the second signal modem, such that audio communication between the first and second telephone lines is effected.

26. The broadband data switch of claim 22, wherein the computer controlled switch comprises a crosspoint matrix.

27. The broadband data switch of claim 22, further comprising an external output circuit, wherein the computer controlled switch couples the demodulated version of the first modulated broadband signal output from the first signal modem to the external output circuit.

28. The broadband data switch of claim 22, wherein the first signal modem receives a second broadband input signal, modulates the second broadband input signal, and injects a modulated version of the second broadband input signal onto the first telephone line in a frequency location which does not interfere with the telephone call signals and does not interfere with the first modulated broadband signal present on the first telephone line;

wherein the second signal modem demodulates a second modulated broadband signal present on the second telephone line and generates a demodulated version of the second modulated broadband signal; and wherein the computer controlled switch couples the demodulated version of the second modulated broadband signal to the second broadband input signal of the first signal modem, such that two-way broadband communication between the first and second telephone lines is effected.

29. The broadband data switch of claim 28, further comprising a mixing circuit which mixes the demodulated version of the first modulated broadband signal with the demodulated version of the second modulated broadband signal and provides a mixed output; and wherein the mixed output is provided as the first broadband input signal to the second signal modem.

30. A broadband data switch for use in a system which includes a telephone switch, the broadband data switch comprising:

a plurality of signal modulators each of which connects to the telephone switch and to a respective telephone line over which telephone calls are transmitted, wherein each signal modulator passes telephone call signals between the telephone switch and one of the respective telephone lines, and wherein each signal modulator modulates a broadband data signal present at an input thereof and injects the modulated broadband data signal onto a respective telephone line in a frequency location which does not interfere with the telephone call signals;

a broadband data circuit which provides a broadband data signal; and a controller coupled between the plurality of signal modulators and the broadband data circuit which, in response to receiving a broadband connection request, couples the broadband data circuit to a selected one of the plurality of signal modulators, such that the broadband data signal is selectively coupled to the selected one signal modulator and is thereafter transmitted over a respective one of the telephone lines.

31. The broadband data switch of claim 30, wherein the controller couples the broadband data circuit to the selected one signal modulator through a crosspoint matrix.

32. The broadband data switch of claim 31, wherein the controller couples the broadband data circuit to more than one of the plurality of signal modulators, such that the same broadband signal is provided to multiple signal modulators.

33. The broadband data switch of claim 30, wherein the broadband data circuit comprises a television tuner circuit which demodulates a television signal and provides a demodulated television signal output.

34. The broadband data switch of claim 30, wherein the broadband data circuit comprises an H.320 compatible coder/decoder which provides an H.320 compatible signal from an external signal line.

35. The broadband data switch of claim 30, wherein the broadband data circuit comprises a conference bridge which mixes a plurality of signal inputs into a single broadband output signal.

36. The broadband data switch of claim 30, wherein the broadband data signal comprises a color video signal, and wherein each signal modulator frequency modulates the color video signal.

37. A system comprising the broadband data switch of claim 30 and a video server coupled to the broadband data switch, wherein the video server supplies video information on demand to the selected one signal modulator.

38. A system comprising the broadband data switch of claim 30 and a plurality of modem/diplexers each associated with a corresponding telephone and coupled to the broadband data switch through a respective telephone line, each modem/diplexer including a broadband signal modulator which modulates a first broadband data signal onto a respective telephone line and demodulates a second broadband data signal from the respective telephone line, wherein the broadband data switch receives the broadband connection request from a telephone user and causes one of the plurality of signal modulators connected to the respective telephone line to be coupled to the broadband data circuit.

39. A method for augmenting an existing telephone network to handle broadband data signals, wherein the existing telephone network includes a plurality of existing telephone lines and an existing telephone switch, the method comprising the steps of:

(1) providing a broadband data switch coupled between the existing telephone switch and the existing telephone lines and which includes a first plurality of telephone line ports each adapted to transmit and receive broadband information over one of the plurality of existing telephone lines, and a second plurality of telephone switch ports each adapted to be connected to the existing telephone switch, wherein telephone call signals are passed between each of a corresponding one of the first plurality of telephone line ports and a corresponding one of the second plurality of telephone switch ports;

(2) disconnecting the existing telephone lines from the existing telephone switch;

(3) reconnecting the existing telephone lines disconnected in step (2) to the first plurality of telephone line ports of the broadband data switch;

(4) connecting the second plurality of telephone switch ports to the existing telephone switch; and (5) using the broadband data switch to transmit broadband data signals over the existing telephone lines without interfering with telephone call signals passed over the existing telephone lines.

40. The method of claim 39, wherein step (5) comprises the steps of:

(a) receiving at the broadband data switch a broadband connection request from a telephone user;

(b) transmitting a list of available users over a data channel on one of the existing telephone lines;

(c) selecting one of the available users; and (d) in the broadband data switch, causing two of the first plurality of telephone line ports to be connected to each other.

* * * * *